(12) United States Patent
Yan et al.

(10) Patent No.: US 12,019,460 B2
(45) Date of Patent: Jun. 25, 2024

(54) SHARED COMPRESSOR

(71) Applicant: Apple Inc., Cupertino, CA (US)

(72) Inventors: Shi Yan, Kelkheim (DE); Peter L. Bielawski, Cupertino, CA (US); Jia Tao, San Jose, CA (US); Johnny L. Wall, Valencia, CA (US); Islam M. Shawki, Santa Clara, CA (US); Jonathan L. Hall, Menlo Park, CA (US); Zheng Li, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/830,372

(22) Filed: Jun. 2, 2022

(65) Prior Publication Data

US 2022/0413523 A1 Dec. 29, 2022

Related U.S. Application Data

(60) Provisional application No. 63/300,711, filed on Jan. 19, 2022, provisional application No. 63/214,536, filed on Jun. 24, 2021.

(51) Int. Cl.
*G05D 7/06* (2006.01)
*B01D 53/26* (2006.01)

(52) U.S. Cl.
CPC ......... *G05D 7/0652* (2013.01); *B01D 53/263* (2013.01); *B60G 2202/152* (2013.01); *B60G 2500/205* (2013.01)

(58) Field of Classification Search
CPC .... Y10T 137/86027; Y10T 137/86051; G05D 7/0652; B01D 53/263; B60G 2202/152; B60G 2500/205

(Continued)

(56) References Cited

U.S. PATENT DOCUMENTS 5,186,522 A 2/1993 Spencer
6,045,332 A * 4/2000 Lee ...................... F04D 15/029
137/565.33

(Continued)

FOREIGN PATENT DOCUMENTS

DE 102016003662 A1 10/2017
DE 102017206265 A1 10/2018

(Continued)

OTHER PUBLICATIONS

Translation of DE 102019131938A1M 2020.*
International Search Report and Written Opinion dated Sep. 20, 2022, in Int'l. App. No. PCT/US2022/031866 (15 pp).

*Primary Examiner* — William M McCalister
(74) *Attorney, Agent, or Firm* — Young Basile Hanlon & MacFarlane, P.C.

(57) ABSTRACT

A system includes a source that provides air, a first compressor stage that receives the air from the source and is configured to compress the air to a first pressure, and a second compressor stage that receives the air from the first compressor stage and is configured to compress the air to a second pressure. The system also includes a first component, a second component, valves that control flow of the air, and a controller that is configured to control the valves according to a first control mode, in which the air is supplied to the first component by the first compressor stage, and a second control mode, in which the air is supplied to the second component by the second compressor stage.

22 Claims, 13 Drawing Sheets

(58) Field of Classification Search
USPC .................................... 137/565.16, 565.18
See application file for complete search history.

(56) References Cited

U.S. PATENT DOCUMENTS

| | | | |
|---|---|---|---|
| 6,505,691 B2 * | 1/2003 | Judge .................... | E21B 21/01 |
| | | | 175/218 |
| 6,726,189 B2 | 4/2004 | Folchert et al. | |
| 7,032,895 B2 | 4/2006 | Folchert | |
| 7,103,991 B2 | 9/2006 | Moulding | |
| 7,306,650 B2 | 12/2007 | Slayzak et al. | |
| 8,777,246 B2 | 7/2014 | Meier | |
| 8,814,190 B2 | 8/2014 | Becher et al. | |
| 9,266,403 B2 | 2/2016 | Suzuki et al. | |
| 9,273,700 B2 | 3/2016 | Bergemann et al. | |
| 9,579,943 B2 | 2/2017 | Frank et al. | |
| 9,707,896 B2 | 7/2017 | Boegel et al. | |
| 9,783,019 B2 * | 10/2017 | Diekmeyer ........... | F15B 11/162 |
| 9,796,359 B2 | 10/2017 | Field et al. | |
| 9,994,080 B2 * | 6/2018 | Hoeldrich ......... | B60C 23/00354 |
| 10,189,450 B2 | 1/2019 | Rice | |
| 10,641,257 B2 | 5/2020 | Bredbeck et al. | |
| 10,704,542 B2 | 7/2020 | Bredbeck et al. | |
| 10,807,583 B2 | 10/2020 | Chun | |
| 10,857,980 B2 | 12/2020 | Rice et al. | |
| 10,960,724 B2 | 3/2021 | Meier | |
| 11,110,386 B2 | 9/2021 | Matsumoto et al. | |
| 2004/0262986 A1 * | 12/2004 | Folchert ............ | B60G 17/0523 |
| | | | 303/1 |
| 2010/0057290 A1 * | 3/2010 | Brillhart ................ | G07C 5/008 |
| | | | 701/31.4 |
| 2015/0068606 A1 * | 3/2015 | Ottestad .................... | F04B 5/02 |
| | | | 137/565.13 |
| 2015/0217672 A1 * | 8/2015 | Shampine ........... | E21B 43/2607 |
| | | | 137/565.18 |
| 2015/0237796 A1 * | 8/2015 | Celli .................... | G01N 21/31 |
| | | | 250/208.2 |
| 2018/0043295 A1 | 2/2018 | Friesen et al. | |
| 2018/0194330 A1 | 7/2018 | Ichikawa et al. | |
| 2020/0001832 A1 | 1/2020 | Deane et al. | |
| 2020/0158104 A1 | 5/2020 | Stabenow | |
| 2020/0282416 A1 * | 9/2020 | Fiebrandt ............ | B05B 1/3006 |
| 2022/0413523 A1 * | 12/2022 | Yan ....................... | F04B 49/007 |

FOREIGN PATENT DOCUMENTS

| | | | | |
|---|---|---|---|---|
| DE | 102018128557 A1 | | 5/2020 | |
| DE | 102019131938 A1 * | | 5/2020 | ............ B60G 11/27 |
| WO | 2009143547 A1 | | 12/2009 | |

* cited by examiner

SHARED COMPRESSOR

CROSS-REFERENCE TO RELATED APPLICATIONS

This application claims the benefit of U.S. Provisional Application No. 63/214,536, filed on Jun. 24, 2021. This application also claims the benefit of U.S. Provisional Application No. 63/300,711, filed on Jan. 19, 2022. The content of the foregoing applications is hereby incorporated herein by reference for all purposes.

FIELD

The present disclosure relates generally to pneumatic systems.

BACKGROUND

Pneumatic devices are operated using compressed air, which may be supplied by a compressor. Pneumatic devices may have particular pressure and/or flow rate requirements.

SUMMARY

A first aspect of the disclosure is a system includes a source that provides air, a first compressor stage that receives the air from the source and is configured to compress the air to a first pressure, and a second compressor stage that receives the air from the first compressor stage and is configured to compress the air to a second pressure. The system also includes a first component, a second component, valves that control flow of the air, and a controller that is configured to control the valves according to a first control mode, in which the air is supplied to the first component by the first compressor stage, and a second control mode, in which the air is supplied to the second component by the second compressor stage.

In some implementations of the system according to the first aspect of the disclosure, the valves allow supply of the air to the first component from the first compressor stage in the first control mode and the valves block supply of the air from the first compressor stage to the first component in the second control mode. In some implementations of the system according to the first aspect of the disclosure, the valves allow supply of the air to the second component from the second compressor stage through a one way valve in the second control mode. In some implementations of the system according to the first aspect of the disclosure, the valves redirect supply of the air from the second compressor stage away from the second component in the first control mode. As examples, the valves may redirect supply of the air from the second compressor stage away from the second component by venting the air to the first component or by venting the air to an ambient environment.

In some implementations of the system according to the first aspect of the disclosure, the system further includes a motor that provides an operating input to the first compressor stage and the second compressor stage. In some implementations of the system according to the first aspect of the disclosure, the system further includes a clutch that disconnects the motor from the second compressor stage so that the second compressor stage does not compress the air in the first control mode.

In some implementations of the system according to the first aspect of the disclosure, the system further includes a first supply path from the first compressor stage to the first component, wherein the air is supplied from the first compressor stage to the first component along the first supply path in the first control mode, and a second supply path from the second compressor stage to the second component, wherein the air is supplied from the second compressor stage to the second component along the second supply path in the second control mode.

In some implementations of the system according to the first aspect of the disclosure, the valves include a first control valve that controls supply of the air to the first component along the first supply path, a second control valve that controls supply of the air to the second component along the second supply path and controls venting of the air from the second component along the second supply path, and a bypass valve that is connected to the second supply path to allow the air from the second stage to bypass the second component. In some implementations of the system according to the first aspect of the disclosure, the system further includes a bypass path that connects the second supply path to the first supply path, wherein the bypass valve is located on the bypass path to allow the air from the second stage to bypass the second component by redirecting the air to the first supply path.

In some implementations of the system according to the first aspect of the disclosure, the system further includes a dryer that is located on the second supply path between the second compressor stage and the second component. In some implementations of the system according to the first aspect of the disclosure, the controller is configured to control the valves according to a third control mode, in which the air is vented from the second component through the dryer, for example, by venting through the first component or by venting to an ambient environment.

In some implementations of the system according to the first aspect of the disclosure, the first component is an air operated cleaning component for a vehicle sensor and the second component is an air operated vehicle suspension component.

A second aspect of the disclosure is a system that includes an inlet, a compressor, a low pressure consumer, and a high pressure consumer. The compressor has a motor, a first stage that is driven by the motor, and a second stage that is driven by the motor, wherein the first stage receives air from the inlet and the second stage receives the air from the first stage. The system also includes a first supply path, a second supply path, a first control valve, a second control valve, and a bypass valve. The first supply path connects the first stage to the low pressure consumer. The air is supplied from the first stage to the low pressure consumer along the first supply path. The second supply path connects the second stage to the high pressure consumer. The air is supplied from the second stage to the high pressure consumer along the second supply path. The first control valve controls supply of the air to the low pressure consumer along the first supply path. The second control valve controls supply of the air to the high pressure consumer along the second supply path and controls venting of the air from the high pressure consumer along the second supply path. The bypass valve is connected to the second supply path to allow the air from the second stage to bypass the high pressure consumer.

In some implementations of the system according to the second aspect of the disclosure, a bypass path that connects the second supply path to the first supply path, wherein the bypass valve is located on the bypass path to allow the air from the second stage to bypass the high pressure consumer by redirecting the air to the first supply path. In some implementations of the system according to the second aspect of the disclosure, the first control valve is movable between an open position and a closed position, the first control valve allows supply of the air to the low pressure consumer along the first supply path in the open position of the first control valve, and the first control valve blocks supply of the air to the low pressure consumer along the first supply path in the closed position of the first control valve.

In some implementations of the system according to the second aspect of the disclosure, the second control valve is movable between a supply position and a vent position, wherein the second control valve restricts the second supply path to one-way flow of the air from the second stage to the high pressure consumer in the supply position of the second control valve, and the second control valve allows venting of the air from the high pressure consumer in the vent position. In some implementations of the system according to the second aspect of the disclosure, a dryer is located on the second supply path so that the air passes through the dryer during supply of the air to the high pressure consumer from the second stage and so that the air passes through the dryer during venting of the air from the high pressure consumer. In some implementations of the system according to the second aspect of the disclosure, a vent path is connected to the second supply path between the second stage and the dryer for venting the air from the high pressure consumer, wherein the second control valve also controls flow of the air along the vent path by blocking flow of the air along the vent path in the supply position of the second control valve and by allowing flow of the air along the vent path in the vent position of the second control valve.

A third aspect of the disclosure is a system that includes an inlet and a compressor. The compressor has a motor, a first stage that is driven by the motor, a second stage that is driven by the motor, and a clutch, wherein the first stage receives air from the inlet, the second stage receives the air from the first stage, and the clutch is configured move between an engaged position and a disengaged position, wherein operation of the motor does not cause operation of the second stage in the disengaged position. The system also includes a low pressure consumer, a high pressure consumer, a first supply path from the first stage to the low pressure consumer, wherein the air is supplied from the first stage to the low pressure consumer along the first supply path, and a second supply path from the second stage to the high pressure consumer, wherein the air is supplied from the second stage to the high pressure consumer along the second supply path. The system also includes a first control valve that controls supply of the air to the low pressure consumer along the first supply path, and a second control valve that controls supply of the air to the high pressure consumer along the second supply path and controls venting of the air from the high pressure consumer along the second supply path. Operation of the motor causes the second stage of the compressor to supply the air to the high pressure consumer along the second supply path when the clutch is in the engaged position.

In some implementations of the system according to the third aspect of the disclosure, the first control valve is movable between an open position and a closed position, the first control valve allows supply of the air to the low pressure consumer along the first supply path in the open position of the first control valve, and the first control valve blocks supply of the air to the low pressure consumer along the first supply path in the closed position of the first control valve. In some implementations of the system according to the third aspect of the disclosure, the second control valve is movable between a supply position and a vent position, wherein the second control valve restricts the second supply path to one-way flow of the air from the second stage to the high pressure consumer in the supply position of the second control valve, and the second control valve allows venting of the air from the high pressure consumer in the vent position.

In some implementations of the system according to the third aspect of the disclosure, the system includes a dryer that is located on the second supply path so that the air passes through the dryer during supply of the air to the high pressure consumer from the second stage and so that the air passes through the dryer during venting of the air from the high pressure consumer. In some implementations of the system according to the third aspect of the disclosure, the system includes a vent path that is connected to the second supply path between the second stage and the dryer for venting the air from the high pressure consumer, wherein the second control valve also controls flow of the air along the vent path by blocking flow of the air along the vent path in the supply position of the second control valve and by allowing flow of the air along the vent path in the vent position of the second control valve.

A fourth aspect of the disclosure is a system that includes an inlet, a first compressor, a second compressor, a low pressure consumer, and a high pressure consumer. The system also includes a first supply path from the first compressor to the low pressure consumer, wherein the air is supplied from the first compressor to the low pressure consumer along the first supply path, a second supply path from the second compressor to the high pressure consumer, wherein the air is supplied from the second compressor to the high pressure consumer along the second supply path, and a diverter path from the high pressure consumer to the low pressure consumer to allow supply of air to the low pressure consumer from the high pressure consumer.

In some implementations of the system according to the fourth aspect of the disclosure, the system includes a first control valve that controls supply of the air to the low pressure consumer along the first supply path, a second control valve that controls supply of the air to the high pressure consumer along the second supply path and controls venting of the air from the high pressure consumer along the second supply path, and a diverter valve that controls supply of the air to the low pressure consumer from the high pressure consumer along the diverter path.

A fifth aspect of the disclosure is a system that includes an inlet, a compressor that receives air from the inlet, a wet air consumer, and a dry air consumer. The system also includes a first supply path from the compressor to the wet air consumer, wherein the air is supplied from the compressor to the wet air consumer along the first supply path, and a first control valve that controls supply of the air to the wet air consumer along the first supply path. The system also includes a second supply path from the compressor to the dry air consumer, pneumatically in communication with the first supply path, wherein the air is supplied from the compressor to the dry air consumer along the second supply path. The system also includes an air dryer that forms a portion of the second supply path to remove moisture from air that is supplied to the dry air consumer from the compressor, wherein moisture is returned to the air from the dryer during venting of the air from the dry air consumer through the dryer.

In some implementations of the system according to the fifth aspect of the disclosure, the wet air consumer is a sensor cleaning system, and the dry air consumer is an air suspension system.

In some implementations of the system according to the fifth aspect of the disclosure, the compressor comprises a first compressor stage that receives the air from the inlet and is configured to compress the air to a first pressure, and a second compressor stage that receives the air from the first compressor stage and is configured to compress the air to a second pressure, and the system further comprises a second control valve that controls supply of the air to the dry air consumer along the second supply path, a third supply path from the first compressor stage to the wet air consumer, wherein the air is supplied from the first compressor stage to the wet air consumer along the third supply path, and a third control valve that controls supply of the air to the wet air consumer along the third supply path. The system may Some implementations of the system according to the fifth aspect of the disclosure further include a vent, and a vent path from the compressor to the vent, pneumatically in communication with the second supply path, wherein the air is supplied from the dry air consumer to the vent along the second supply path and vent path, and a vent valve that controls supply of the air to the vent along the vent path.

Some implementations of the system according to the fifth aspect of the disclosure further include a vent, a vent path from the first control valve to the vent, pneumatically in communication with the first supply path, wherein the air is supplied from the dry air consumer to the vent along the second supply path, the first supply path and vent path, and a vent valve that controls supply of the air to the vent along the vent path.

DETAILED DESCRIPTION

The disclosure herein is directed to a system in which two different pneumatic devices having differing pressure and flow rate requirements are operated using air supplied by a shared compressor. The shared compressors used in the systems described herein include a single motor that drives a first compressor stage and a second compressor stage. In a typical dual stage compressor system, air is compressed by the first compressor stage and the second compressor stage in series. In the systems described herein, the first and second stages are controlled to supply compressed air at different pressures and/or flow rates to a first pneumatic device and a second pneumatic device according to two or more control modes.

The system described herein may be implemented in the context of a vehicle to supply pressurized air to two different vehicle systems, where the first vehicle system uses low pressure air at a high flow rate and the second vehicle system uses high pressure air at a low flow rate. As an example, the first vehicle system may be a cleaning system that is configured to clear debris from a sensor system component, and the second vehicle system may be an air operated suspension component.

Figure 1:
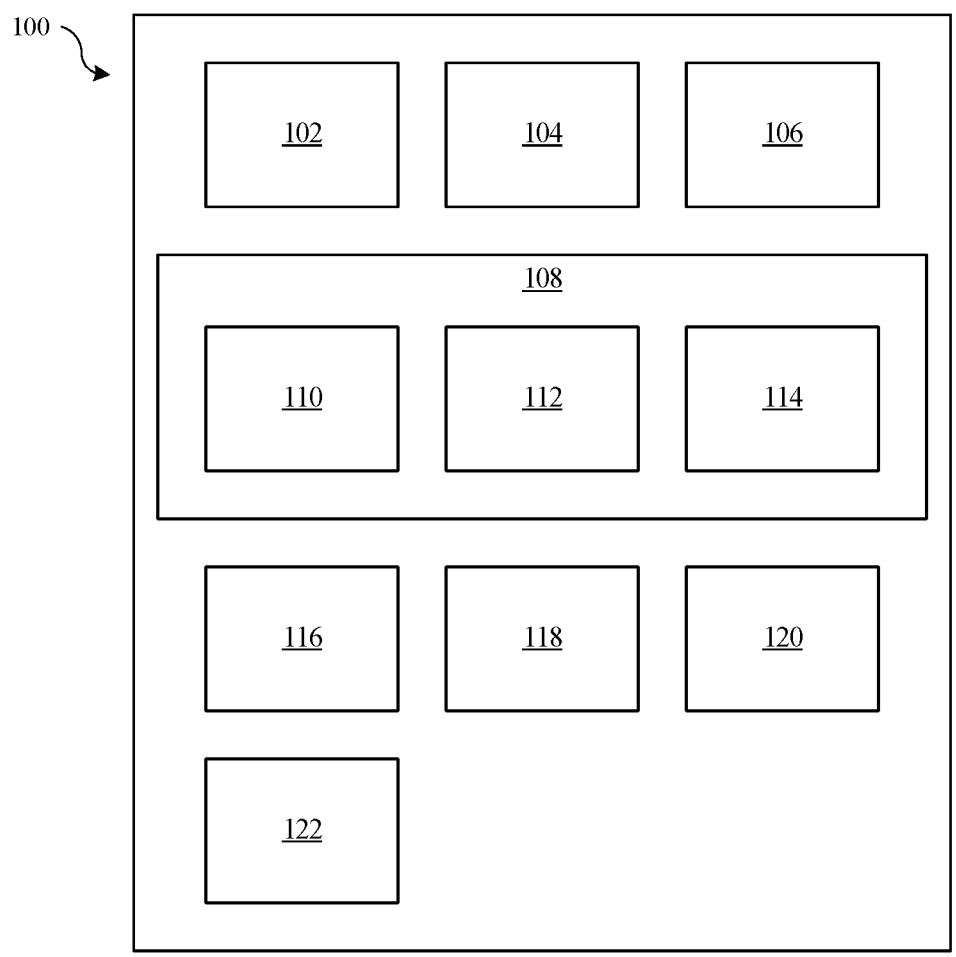
FIG. 1 is a block diagram of a system.

FIG. 1 is a block diagram of a system 100. The system 100 obtains air from a source 102 and supplies air to a first component 104 and a second component 106. The system 100 also includes a compressor 108. The compressor 108 includes a motor 110, a first stage 112, and a second stage 114. The system 100 also includes fluid paths 116, a dryer 118, valves 120, and a controller 122.

The source 102 functions as an air inlet of the system 100. The source 102 supplies air to the system 100 for compression and delivery by the system to components of the system 100 such as the first component 104 and the second component 106. The source 102 may be a single source or may combine air from multiple sources in an actively controlled manner or a passive manner. The source 102 may be or include a supply of ambient air, such as air from an environment around the system 100 at an environmental temperature and pressure. The source 102 may be or include a supply of pressurized air, such as exhaust air from a portion of the system 100 or another system.

The first component 104 and the second component 106 are pneumatically operated components that are operated by a supply or pressurized air that is provided by other components of the system 100. Components that are operated by pressurized air may be referred to herein as consumers. The term consumers is intended to include components that do not return the pressurized air to the system 100 (e.g., by venting the air through the component during operation of the component), as well as components that return the pressurized air to the system 100 for venting by the system 100 or for use by another component of the system 100. The first component 104 and the second component 106 may include subcomponents that perform a function as well as ancillary subcomponents such as reservoirs, valves, regulators, etc. In an example implementation where the system 100 is used in the context of a vehicle, the first component 104 may be an air operated cleaning component for a vehicle sensor and the second component 106 may be an air operated vehicle suspension component. The system 100 may be implemented in the context of other types of machines and using other types of components.

In the examples described herein, the first component 104 is designed to operate using air at a first pressure level and a first flow rate, the second component 106 is designed to operate using air at a second pressure level and a second flow rate. The first pressure level may be lower than the second pressure level, and the first flow rate may be higher than the second flow rate. In some implementations, the first component 104 may be referred to as a low pressure consumer and the second component 106 may be referred to as a high pressure consumer. In the examples described herein, the second component 106 returns air to the system 100, either for venting by the system 100 and/or for use by a different component of the system 100, such as the first component 104. It should also be understood that the system 100 may include additional components and that the first component 104 and the second component 106 may be representative members of groups of components.

The compressor 108 (e.g., an air compressor) receives air from the source 102 and raises the pressure of the air (e.g., the compressor 108 compresses the air or pressurizes the air). The compressor 108 is a two-stage compressor. The motor 110 of the compressor 108 may be an electric motor with a rotating output, or other types of motors may be used. The motor 110 provides an operating input (e.g., a rotational input) to the first stage 112 (e.g., a first compressor stage) and the second stage 114 (e.g., a second compressor stage) of the compressor 108, such that operation of the motor 110 causes operation of the first stage 112 and/or the second stage through connection of the output of the motor 110 to inputs of the first stage 112 and the second stage 114. As an example, the motor 110 may have an output shaft that is connected a mechanical input part of the first stage 112 and to a mechanical input part of the second stage 114. These connections may be direct or indirect. The compressor 108 may be configured to selectively operate the second stage 114 to allow independent operation of the first stage 112 of the compressor 108. For example, the compressor 108 may include a clutch that disconnects the motor from the second stage 114 of the compressor 108 so that the second stage 114 of the compressor 108 does not compress the air when disconnected, for example, to supply the air to the first component 104 without supplying the air to the second component 106.

The first stage 112 and the second stage 114 of the compressor 108 are each components that are configured to compress air and may be implemented according to known compressor designs. As examples, the first stage 112 and the second stage 114 may be lobe compressors, piston compressors, wobble compressors, or other types of compressors. The first stage 112 of the compressor 108 is in fluid communication with the source 102 so that the source 102 is able to supply the air to the first stage of the compressor 108. The first stage 112 of the compressor 108 is in fluid communication with the second stage 114 of the compressor 108 so that the first stage 112 of the compressor 108 is able to supply the air to the second stage 114 of the compressor 108.

During operation of the system 100, the first stage 112 and the second stage 114 of the compressor 108 are operated by the motor 110 of the compressor 108. For example, by connection of a rotational output of the motor 110 to a mechanical input part of the first stage 112 and the second stage 114 that causes operation of the air compressing mechanisms of the first stage 112 and the second stage 114. Air is supplied from the source 102 to the first stage 112 of the compressor 108. The first stage 112 compresses the air to a first pressure level, which is provided at an outlet of the first stage 112. In some control modes of the system 100, as will be explained further herein, some or all of the air from the outlet of the first stage 112 is provided to an inlet of the second stage 114. The air that is provided to the second stage 114 may be compressed by the second stage 114 to a second pressure level, which is provided at an outlet of the second stage 114.

The fluid paths 116 of the system 100 are fluid communication channels of any kind that allow passage of air between components. The fluid paths 116 may include supply paths that supply the air to the first component 104 and the second component 106, a bypass path that allows the air from the compressor to bypass the second component 106, and be vented to the first component 104 or to atmosphere, and/or a vent path that allows venting to atmosphere.

The dryer 118 is a component that is configured to remove moisture from the air that is being supplied to the second component 106, which allows the system 100 to be used to supply air to moisture-sensitive components that require dry air for operation. As one example, the dryer 118 may be a desiccant air dryer that includes a desiccant material (e.g., a silica gel). The dryer 118 may be located between the second stage 114 of the compressor 108 and the dryer 118. The desiccant material of the dryer 118 removes moisture from the air as it passes through the dryer 118 during supply of the air from the second stage 114 of the compressor 108 to the second component 106. During venting of the air from the second component 106, the air from the second component 106 travels in the opposite direction through the dryer 118, and the air absorbs moisture from the desiccant material of the dryer 118 during venting.

The valves 120 control flow of the air through the system, such as by controlling flow between various portions of the system 100 including inlets, outlets, fluid paths, components, and other features. The valves 120 may be located along the fluid paths 116 to control flow along the fluid paths. The valves 120 may be, as examples, switch valves, check valves, or assemblies that include two or more types of valve. Thus, the term "valve" may be used herein to describe one of the valves 120 that concurrently controls flow along two or more of the fluid paths 116 with two valve members that may move between first and second positions in unison.

At least some of the valves 120 are actively controllable, such as by the controller 122 in the form of commands (e.g., electrical signals, data transmissions, etc.) from the controller to the valves 120. The valves 120 can be controlled either directly by the controller 122 (e.g., an electrically operated valve) or indirectly through pneumatic operation using an electrically operated pilot valve that is in turn directly controlled by the controller 122. The controller 122 may also control operation of the compressor 108, such as by activating or deactivating the motor 110 of the compressor 108.

The controller 122 may control the valves 120 according to control modes of the system 100. As an example, the controller 122 may control the valves 120 according to a first control mode that corresponds to supply of the air to the first component 104, and may include controlling the valves 120 so that air is supplied to the first component 104 from the first stage 112 of the compressor 108. As an example, the controller 122 may control the valves 120 according to a second control mode may correspond to supply of the air to the second component 106, and may include controlling the valves 120 so that air is supplied to the second component 106 from the second stage 114 of the compressor 108. As an example, the controller 122 may control the valves 120 according to a third control mode, in which the air is vented from the second component 106 through the dryer 118 in order to remove moisture from the desiccant material, such as by venting the air to the first component 104 or by venting the air an ambient environment through an outlet of the system 100 in the third control mode.

The valves 120 may further be controlled to allow supply of the air to the first component 104 from the first stage 112 of the compressor 108 in the first control mode and to block supply of the air from the first stage 112 of the compressor 108 to the first component 104 in the second control mode. The valves 120 may further be controlled to allow supply of the air to the second component 106 from the second stage 114 of the compressor 108 through a one way valve in the second control mode. The valves 120 may be controlled to redirect supply of the air from the second stage 114 of the compressor away from the second component 106 in the first control mode. As examples, the valves 120 may redirect supply of the air from the second stage 114 of the compressor 108 away from the second component 106 by venting the air to the first component 104 or by venting the air to an ambient environment.

Figure 2:
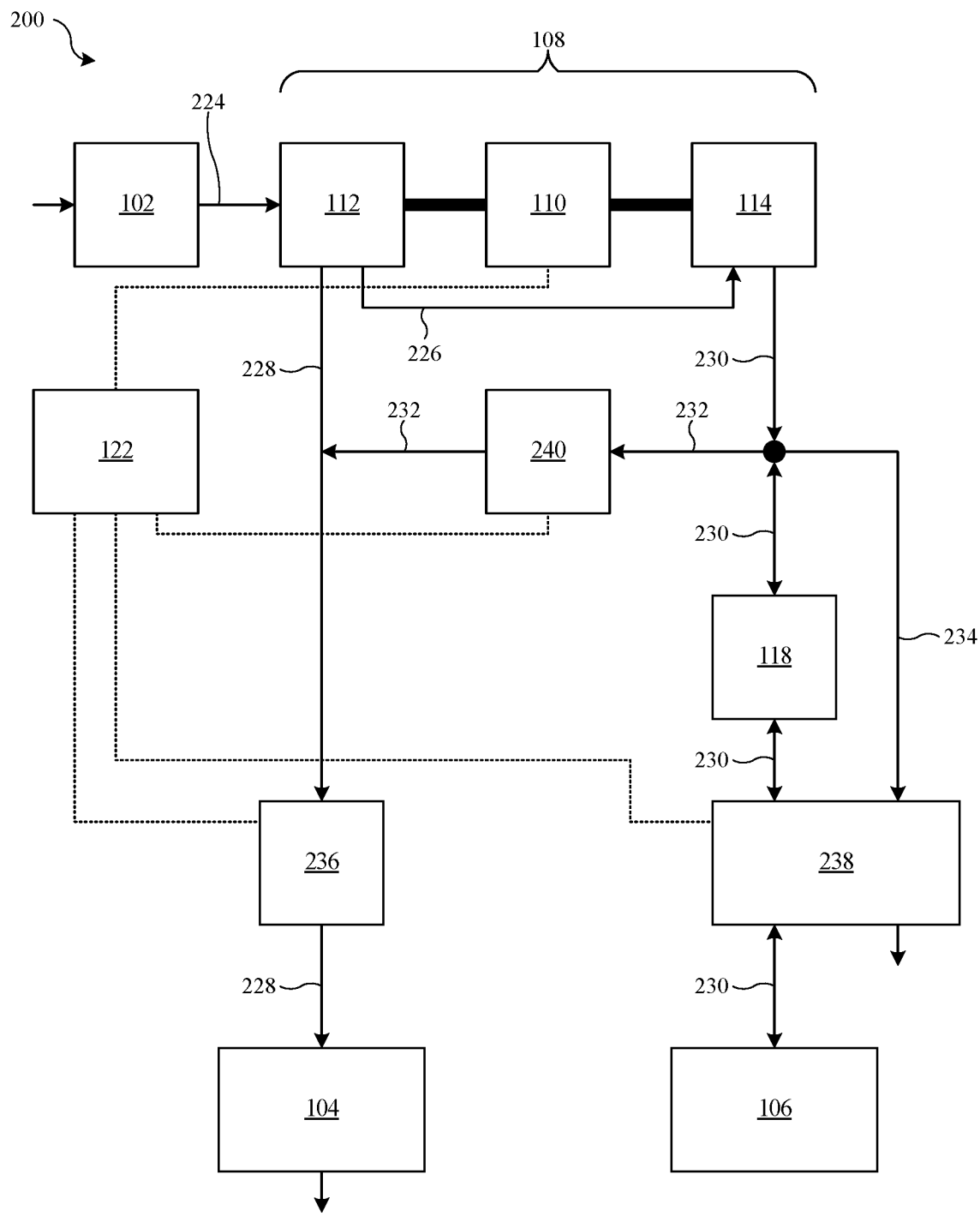
FIG. 2 is an illustration of a first example implementation of the system.

FIG. 2 is an illustration of a system 200, which is a first example implementation of the system 100. The description of the system 100 is applicable to the system 200, and all features of the system 100 may be included in the system 200. Like numbered parts from the system 100 are included in the system 100 and are implemented according to the previous description unless stated otherwise.

In the system 200, an inlet path 224 extends from the source 102 to an inlet of the first stage 112 of the compressor 108 so that the air may flow to the compressor 108 along the inlet path 224. An outlet of the first stage 112 of the compressor 108 is connected to an inlet of the second stage 114 of the compressor 108 by a compressor path 226. The outlet of first stage 112 of the compressor 108 is also connected to a first supply path 228 that allows the first stage 112 of the compressor 108 to supply the air to the first component 104. The first supply path 228 of the system 100 is a fluid communication channel of any kind that allows air from the first stage 112 of the compressor 108 to be supplied to the first component 104. The first supply path 228 extends from the first stage 112 of the compressor 108 to the first component 104 without passing through the second stage 114 of the compressor 108.

An outlet of the second stage 114 of the compressor 108 is connected to a second supply path 230 that allows the second stage 114 of the compressor 108 to supply the air to the second component 106. The second supply path 230 of the system 100 is a fluid communication channel of any kind that allows air from the second stage 114 of the compressor 108 to be supplied to the second component 106. The second supply path 230 extends from the second stage 114 of the compressor 108 to the second component 106 and is operable to deliver the air to the second component 106 after compression of the air by the first stage 112 and the second stage 114 of the compressor 108. All or part of the second supply path 230 may allow two way flow of the air to allow both supply of the air to the second component 106 and venting of the air from the second component 106 as will be explained further herein. The dryer 118 is located along the second supply path 230 between the second stage 114 of the compressor 108 and the second component 106.

The second supply path 230 is connected to a bypass path 232 that extends from the second supply path 230 to the first supply path 228 in order to allow the air from the second stage 114 to be redirected from the second component 106 to the first component 104 as will be described further herein. The bypass path 232 is a fluid communication channel of any kind that connects the second supply path 230 to the first supply path 228 to allow the air from the second supply path 230 to be directed to the first supply path 228. This allows air from the second stage 114 of the compressor 108 to bypass the second component 106. Redirection of the air along the bypass path 232 is selective and controlled, as will be described further herein.

The second supply path 230 is also connected to a vent path 234. The vent path 234 is a fluid communication channel of any kind that connects the second supply path 230 to a vent, such as an outlet from the system 200. The vent path 234 allows the air to be vented to the environment around the system 200, for example, to allow venting of air from the second component 106 to the environment.

The system 200 includes a first control valve 236. The first control valve 236 is located along the first supply path 228 between the first stage 112 of the compressor 108 and the first component 104 and controls supply of the air to the first component 104 along the first supply path 228. The first control valve 236 is movable between an open position and a closed position. The first control valve 236 allows supply of the air to the first component 104 along the first supply path 228 in the open position of the first control valve 236. The first control valve 236 blocks supply of the air to the first component 104 along the first supply path 228 in the closed position of the first control valve 236. The first control valve 236 may be a normally open valve that is in the open position absent activation of the first control valve 236 by the controller 122.

The system 200 includes a second control valve 238. The second control valve 238 is located along the second supply path 230 between the second stage 114 of the compressor 108 and the second component 106. The second control valve 238 controls supply of the air to the second component 106 along the second supply path 230 and controls venting of the air from the second component 106 along the second supply path 230.

The second control valve 238 is movable between a supply position and a vent position. The second control valve 238 functions as a check valve in the supply position, and allows flow of the air to the second component 106 while blocking return of the air from the second component 106. Thus, the first supply path 228 valve restricts the second supply path 230 to one-way flow of the air from the second stage 114 of the compressor 108 to the second component 106 in the supply position of the second control valve 238. The second control valve 238 allows venting of the air from the second component 106 through the second control valve 238. The dryer 118 located on the second supply path 230 so that the air passes through the dryer 118 during supply of the air to the second component 106 from the second stage 114 of the compressor 108 and so that the air passes through the dryer 118 during venting of the air from the second component 106.

In the illustrated implementation, the second control valve 238 is an assembly that includes valve members, with the first regulating flow along the second supply path 230 as previously described and the second control valve 238 functioning as a vent valve that is located along the vent path 234. The vent path 234 is connected to the second supply path 230 between the second stage 114 of the compressor 108 and the dryer 118 for venting the air from the second component 106. The second control valve 238 also controls flow of the air along the vent path 234 by blocking flow of the air along the vent path 234 in the supply position of the second control valve 238 and by allowing flow of the air along the vent path 234 in the vent position of the second control valve 238. Thus, when the second control valve 238 is in the supply position, the air can be supplied to the second component 106 by one-way flow through the second control valve 238 while flow along the vent path 234 is blocked by the second control valve. In the vent position of the second control valve 238, the air flows is allowed to flow from the second control valve 238 from the second component 106 to the dryer 118 and is allowed to exit the system 200 along the vent path 234 by the second control valve 238 opening the vent path 234. In alternative implementations, a separate vent valve can be used to control flow of the air along the vent path 234.

The system 200 also includes a bypass valve 240. The bypass valve 240 is located on the bypass path 232 to selectively allow the air from the second stage 114 of the compressor 108 to bypass the second component 106 by flowing along the bypass path 232 from the second supply path 230 to the first supply path 228, thereby redirecting the air away from the second component 106, so that the air does not flow to the second component 106 because of higher resistance (e.g., pressure across the one-way passage through the second control valve) along the second supply path 230 to the second component 106 as compared to the bypass path 232.

The bypass valve 240 is movable between an open position and a closed position. The bypass valve 240 allows flow of the air along the bypass path 232 in the open position so that the air may flow from the second supply path 230 to the first supply path. The bypass valve 240 blocks flow of the air along the bypass path 232 in the closed position. When the bypass valve 240 is in the closed position, the air may be supplied to the second component 106 in response to operation of the second stage 114 of the compressor 108. The bypass valve 240 may be a normally open valve that is in the open position absent activation of the bypass valve 240 by the controller 122.

In the system 200, the controller 122 is configured to control the motor 110 of the compressor 108, the first control valve 236, the second control valve 238, and the bypass valve 240. The controller 122 is configured to operate the system 200 in multiple control modes. As examples, the control modes may be selected by the controller 122 according to program instructions that are executed by the controller 122, or the control modes may be selected by the controller in response to requests that are received from other systems.

In a first control mode, the compressor 108 is operated, the first control valve 236 is in the open position, the second control valve 238 is in the supply position, and the bypass valve 240 is in the open position. Accordingly, the air is supplied from the first stage 112 of the compressor 108 to the first component 104 along the first supply path 228 in the first control mode and air from the second stage 114 of the compressor 108 flows along the bypass path 232 to the first supply path 228.

In a second control mode, the compressor 108 is operated, the second control valve 238 is in the supply position, the bypass valve 240 is in the closed position, and the vent path 234 is blocked (e.g., by the second control valve). Accordingly, the air is supplied from the second stage 114 of the compressor 108 to the second component 106 along the second supply path 230 in the second control mode.

In a third control mode, the air is vented from the second component 106 through the dryer 118. In the third control mode, the compressor 108 is not operating, the second control valve 238 is in the vent position, the bypass valve 240 is in the closed position, and the vent path 234 is not blocked.

Figure 3:
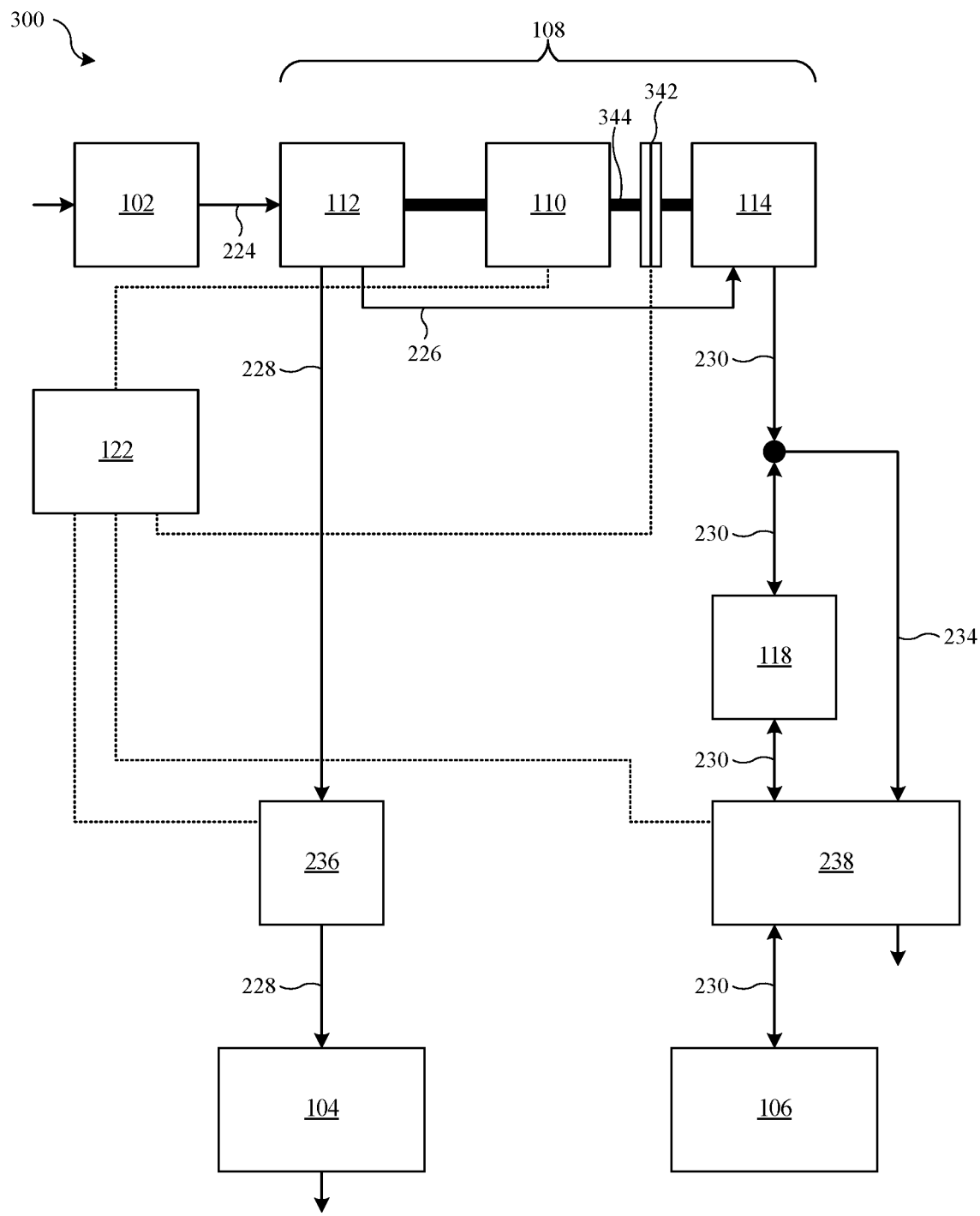
FIG. 3 is an illustration of a second example implementation of the system.

FIG. 3 is an illustration of a system 300, which is a second example implementation of the system 100. In the system 300, the bypass path 232 and the bypass valve 240 of the system 200 are omitted in favor of selective disconnection of the motor 110 from the second stage 114 of the compressor. The descriptions of the system 100 and the system 200 are applicable to the system 300, and all features of the system 100 and the system 200 may be included in the system 300. Like numbered parts from the system 100 and the system 200 are included in the system 300 and are implemented according to the previous description unless stated otherwise.

The compressor 108 is modified relative to the system 200 to include a clutch 342 to selectively disconnect the motor 110 (e.g., disconnection of the operating input provided by the motor) from the second stage 114 of the compressor 108 so that the second stage 114 does not compress the air. The clutch 342 may be located along a connecting shaft 344 that is configured to transfer the operating input (e.g., torque) from the motor 110 to the compressor 108. As an example, the clutch 342 may be operable (e.g., under control from the controller 122 or in response to the motor speed of the motor 110, by engaging above a threshold motor speed as in a centrifugal clutch) to move between an engaged position, in which the clutch 342 connects the motor 110 to the second stage 114 to operate the second stage 114 in response to operation of the motor 110, and a disengaged position, in which the clutch 342 disconnects the motor 110 from the second stage 114 of the compressor 108 so that operation of the motor 110 does not cause a corresponding operation of the second stage 114, thereby allowing the first stage 112 of the compressor 108 to be operated independent of operation of the second stage 114 of the compressor 108.

Operation of the clutch 342 is controlled by the controller 122 according to the control mode of the system 300. The first control mode of the system 300 is as previously described, except that the clutch 342 is in the disengaged position so that the motor 110 operates the first stage 112 of the compressor 108 but does not operate the second stage 114 of the compressor 108. The second control mode of the system 300 is as previously described, with the clutch 342 in the engaged position so that the second stage 114 of the compressor 108 is operated.

Figure 4:
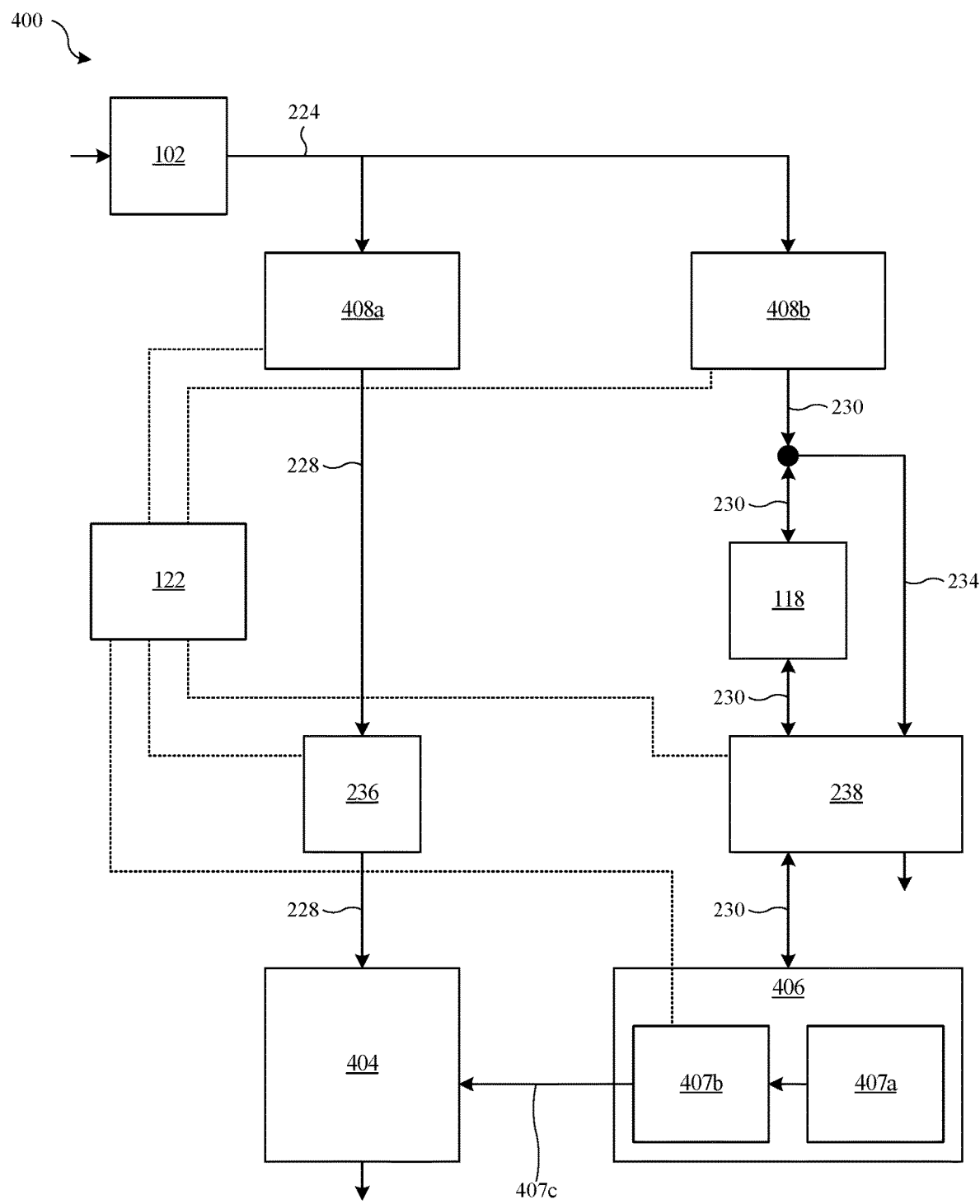
FIG. 4 is an illustration of a third example implementation of the system.

FIG. 4 is an illustration of a system 400, which is a third example implementation of the system 100. The descriptions of the system 100 and the system 200 are applicable to the system 400, and all features of the system 100 and the system 200 may be included in the system 400. Like numbered parts from the system 100 and the system 200 are included in the system 400 and are implemented according to the previous description unless stated otherwise.

The compressor 108 of the system 100 is omitted in favor of a first compressor 408a and a second compressor 408b. The first compressor 408a may be configured to supply the air at a high flow rate and low pressure, and the second compressor 408b may be configured to supply the air at a low flow rate and high pressure, similar to the functions performed by the first stage 112 and the second stage 114 of the compressor 108. The first compressor 408a supplies air to a first component 404. The second compressor 408b supplies air to a second component 406. The first component 404 and the second component may be a low pressure consumer and a high pressure consumer, and may be implemented in the manner described with respect to the first component 104 and the second component 106, except as described herein. Air that is supplied to the second component 406 by the second compressor 408b may be diverted from the second component 406 to the first component 404, as will be explained herein. As an example, the air may be diverted to the first component 404 from the second component 406 if the first compressor 408a is inoperable or otherwise unable to supply the air to the first component 404 or unable to supply a sufficient volume of the air to the first component 404.

In the illustrated implementation, the first compressor 408a and the second compressor 408b both of which receive air from the source 102 through the inlet path 224, which may be connected directly to both of the first compressor 408a and the second compressor 408b. Alternatively, separate sources and/or inlet paths may be used. The first compressor 408a and the second compressor 408b may be single stage or multi-stage compressors. As an example, each of the first compressor 408a and the second compressor 408b may include a motor, a first compressor stage, and optionally a second compressor stage, as described with respect to the compressor 108, the motor 110, the first stage 112 and the second stage 114.

The first supply path 228 and the first control valve 236 are implemented in the manner described with respect to the system 200, with the first supply path 228 extending from the first compressor 408a to the first component 404, and with flow along the first supply path 228 controlled by the first control valve 236. Optionally, the first control valve 236 can be omitted, with flow along the first supply path being dependent only on operation of the first compressor 408a. The second supply path 230 and the second control valve 238 are implemented in the manner described with respect to the system 200, with the second supply path 230 extending from the second compressor 408b to the second component 406, with the dryer 118 being positioned along the second supply path 230, and with the second control valve 238 controlling flow along the second supply path 230. The vent path 234 is implemented as previously described. The bypass path 232 and the bypass valve 240 of the system 200 are omitted.

The second component 406 includes a reservoir 407a, a diverter valve 407b, and a diverter path 407c. The reservoir 407a is pressurized with air received from the second supply path 230 and is used to cause operation of functional portions of the second component 406 (e.g., to supply air to air springs using one or more valves, all of which may be part of the second component 406). The air in the reservoir 407a may be supplied to the first component 404 by operation of the diverter valve 407b (e.g., a switch valve) to cause supply or air when open or cease supply or air when closed to the first component 404 through the diverter path 407c. As an example, the controller 122 may cause (e.g., through a command or a pilot valve) the diverter valve 407b to move to the open position to supply air to the first component 404 in the event of inoperability of the first compressor 408a or in the event of insufficient supply of air from the first compressor 408a to the first component 404. Otherwise, operation of the system 400 is according to the description of the system 200.

Figure 5:
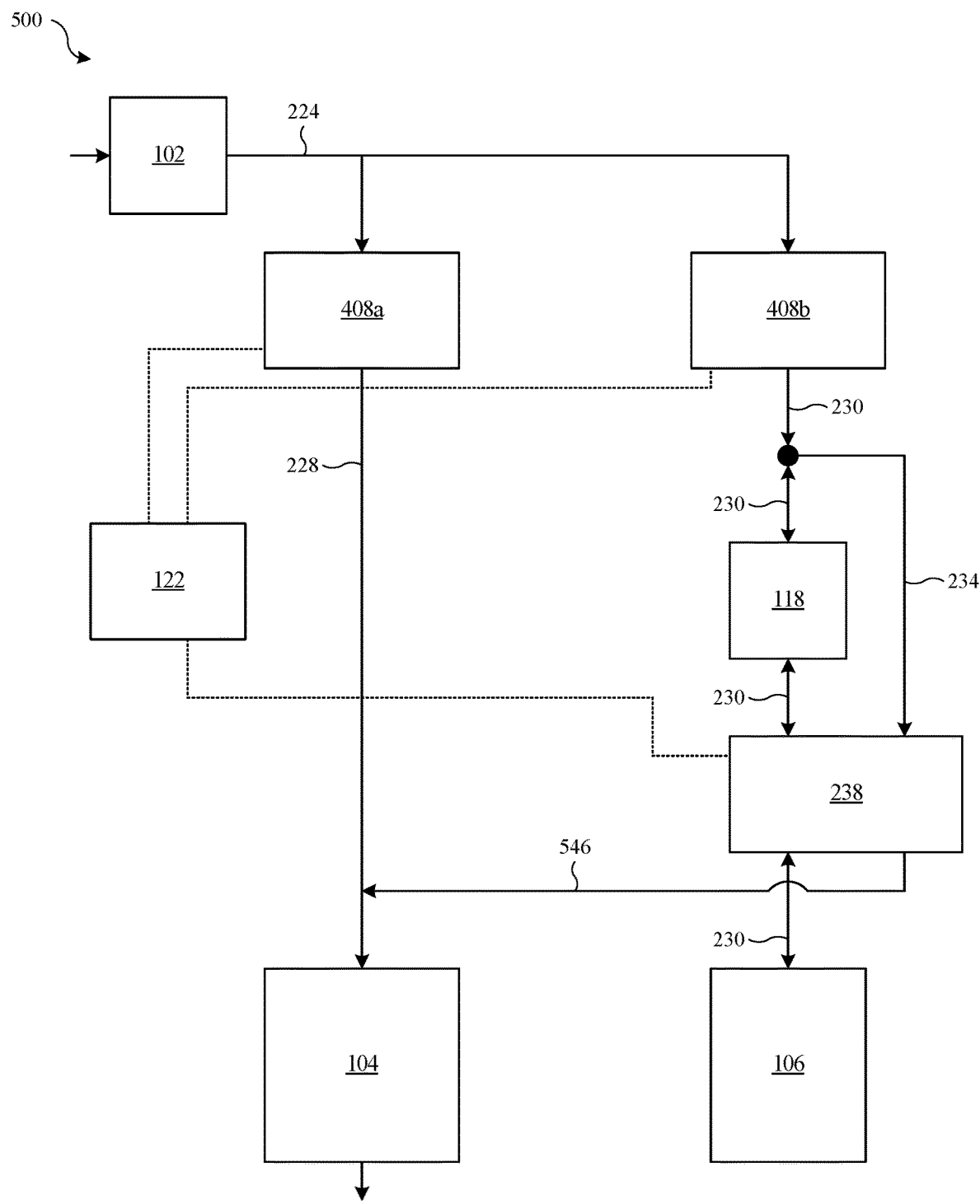
FIG. 5 is an illustration of a fourth example implementation of the system.

FIG. 5 is an illustration of a system 500, which is a fourth example implementation of the system 100. The descriptions of the system 100 and the system 200 are applicable to the system 500, and all features of the system 100 and the system 200 may be included in the system 500. Like numbered parts from the system 100 and the system 200 are included in the system 500 and are implemented according to the previous description unless stated otherwise.

The compressor 108 of the system 100 is omitted in favor of the first compressor 408a and the second compressor 408b as described with respect to the system 400, and the first compressor 408a and the second compressor 408b are operated separately to supply air to the first component 104 and the second component 106, respectively.

The first supply path 228 and the first control valve 236 are implemented in the manner described with respect to the system 200, with the first supply path 228 extending from the first compressor 408a to the first component 404, except that the first control valve 236 is omitted. The second supply path 230 and the second control valve 238 are implemented in the manner described with respect to the system 200, with the second supply path 230 extending from the second compressor 408b to the second component 406, with the dryer 118 being positioned along the second supply path 230, and with the second control valve 238 controlling flow along the second supply path 230. The vent path 234 is implemented as previously described. The bypass path 232 and the bypass valve 240 of the system 200 are omitted. An exhaust diverter path 546 is added to divert air that is vented from the second component 106 via the vent path 234 and the second control valve 238. When air is vented from the second component 106, it is supplied to the first component 104 via the exhaust diverter path 546. Otherwise, operation of the system 500 is according to the description of the system 200.

Figure 6:
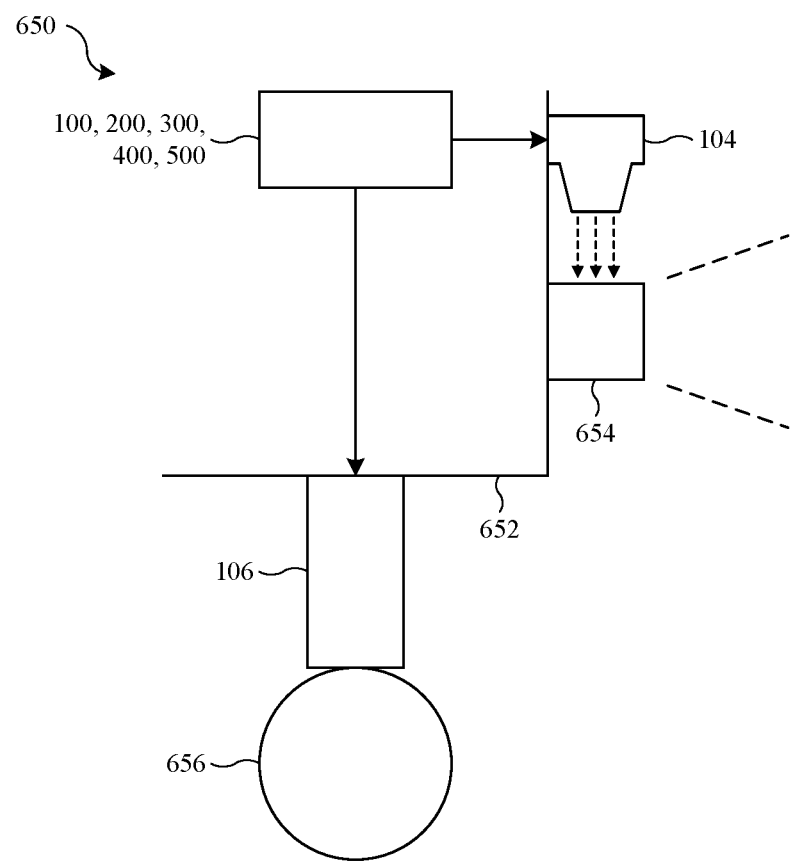
FIG. 6 is an illustration of the system implemented in a vehicle.

FIG. 6 is an illustration of any one of the system 100, the system 200, the system 300, the system 400, or the system 500 implemented in a vehicle 650 that includes a vehicle body 652. The vehicle 650 includes a vehicle sensor 654 (e.g., camera, lidar, etc., inclusive of a lens or see-through cover) that is subjected to dirt or other debris, and the first component 104 is a cleaning component that is configured to clean the vehicle sensor 654 using the air from the system 100, the system 200, or the system 300. A wheel 656 is connected to the vehicle body 652 by the second component 106, which is an air operated active suspension component that controls transmission of vibration from the wheel 656 to the vehicle body 652 using the air from the system 100, the system 200, the system 300, the system 400, or the system 500.

Additional examples of systems for supplying air to a first component and a second component are described further herein with reference to FIGS. 7-13. Features of these systems may be implemented in the manner described with respect to features of the system 100, the system 200, the system 300, the system 400, and the system 500, and these systems may be implemented in a vehicle in the manner described with respect to the vehicle 650 of FIG. 6.

Figure 7:
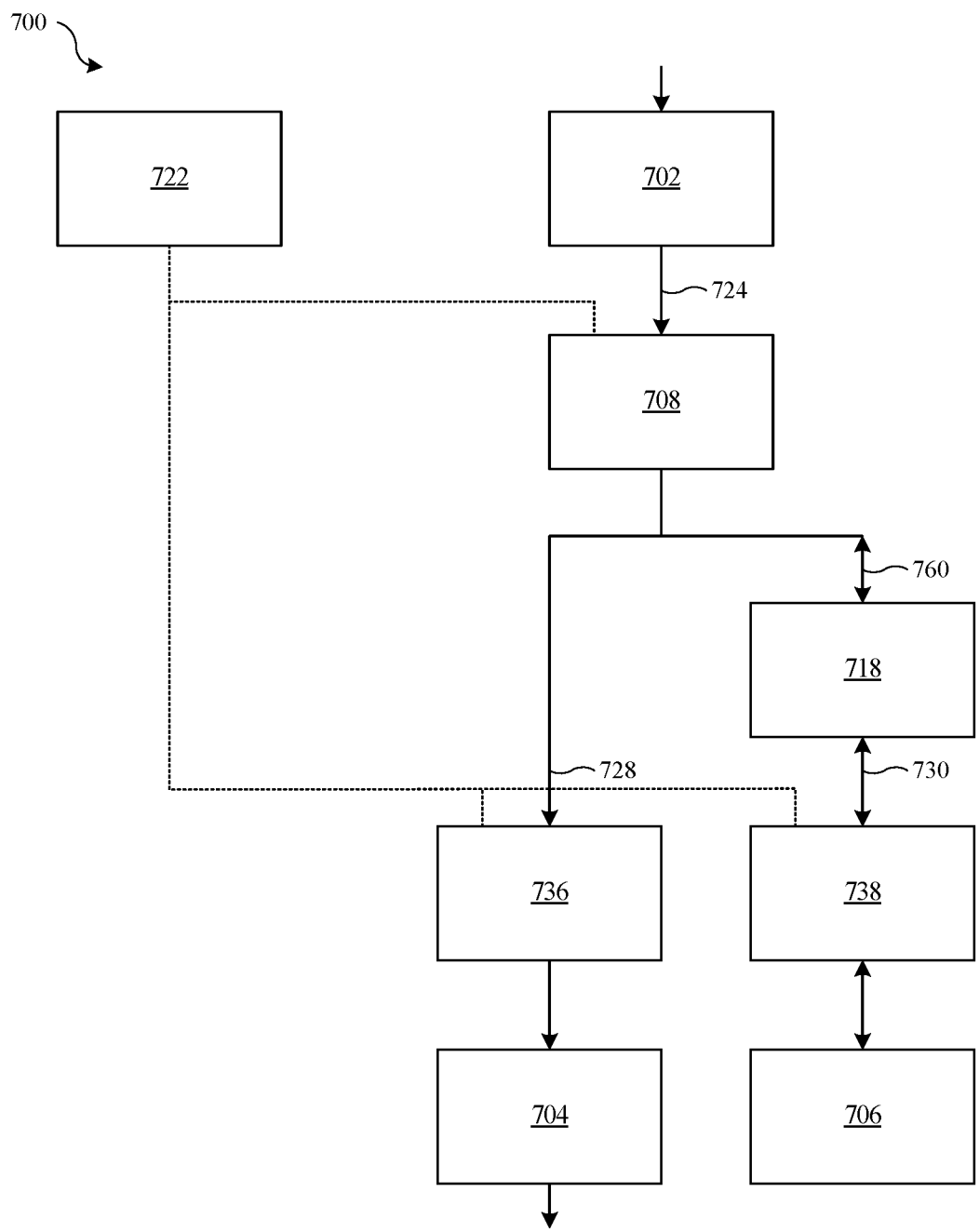
FIG. 7 is an illustration of a system according to a further example.

FIG. 7 is an illustration of a system 700, which is an example implementation of the system 100 in which the compressor may be a single stage compressor. The descriptions of the system 100 and the system 200, as well as their respective components and features, are applicable to the system 700 and may be used in implementing the system 700. The system 700 includes a source 702, which may be an inlet that is exposed to ambient air, a first component 704, a second component 706, a compressor 708, a dryer 718, and a controller 722, which may be implemented according to the description of the source 102, the first component 104, the second component 106, the compressor 108, the dryer 118, and the controller 122 of FIG. 1 except as otherwise described herein.

The compressor 708 is a single stage air compressor in the illustrated implementation, but may instead be a two-stage compressor according to the description of the compressor 108 and/or other compressors described herein. The compressor 708 receives air from an inlet path 724 is operated to supply compressed air to the dryer 718 along a dryer supply path 760 that extends from an outlet of the compressor 708 to the dryer 718. The compressor 708 is selectively operated by the controller 722, such as by switching on and switching off operation of the compressor 708 to supply compressed air or to stop supplying compressed air, in response to control signals from the controller 722.

The dryer 718 is implemented according to the description of the dryer 118, and is configured to reduce the amount of moisture in the air prior to supply of the air from the dryer 718 to a first component 704 and a second component 706, which are equivalent to the first component 104 and the second component 706 as previously described. The first component 704 may be a component that is not sensitive to the presence of moisture in the air that is supplied to it, and may be referred to as a wet air consumer. The second component 706 may be sensitive to the presence of moisture in the air that is supplied to it, is configured to use dry air having a moisture content lower than the moisture content of the air that is supplied by the compressor 708, and may be referred to as a dry air consumer. As will be explained, the dryer 718 may be configured to dry air that is supplied to the second component 706 (e.g., the dry air consumer), and the dryer may be regenerated (e.g., by transfer of moisture from the dryer 718 into the air) when air is vented to the first component 704 (e.g., the wet air consumer) from the second component 706 through the dryer 718.

The air is supplied from the compressor 708 to the first component 704 along a first supply path 728 that extends from the compressor 708 to the first component 704 to provide fluid communication between the compressor 708 and the first component 704. Supply of the air along the first supply path 728 is controlled by a first control valve 736. The first control valve 736 is an electronically controlled pneumatic valve that is configured to move between a closed position, in which no air is supplied to the first component 704 from the compressor 708, and an open position, in which air flows to the first component 704 from the compressor 708 along the first supply path 728, in response to control signals from the controller 722. Air supplied to the first component 704 from the compressor 708 is not returned to the compressor 708 along the first supply path 728, and may be exhausted to ambient by the first component 704.

The air is supplied from the dryer 718 to the second component 706 along a second supply path 730 that extends from the dryer 718 to the second component 706 to provide fluid communication between the dryer 718 and the second component 706. The second supply path 730 may be pneumatically in communication with the first supply path 728, for example, by a connection of the two supply paths at or in communication with the outlet of the compressor 708. Supply of the air along the second supply path 730 is controlled by a second control valve 738. The second control valve 738 is an electronically controlled pneumatic valve that is configured to move between a closed position, in which fluid communication along the second supply path 730 is blocked, and an open position, in which fluid communication along the second supply path 730 is established, in response to control signals from the controller 722. Air supplied to the second component 706 from the dryer 718 may be returned to the dryer 718 along the second supply path 730, for example, when the second control valve 738 is in the open position and the compressor 708 is not operating and therefore not supplying compressed air to the dryer 718.

In a first control mode of the system 700, the compressor 708 is operated to supply compressed air, the first control valve 736 is in the closed position, and the second control valve 738 is in the open position. The compressed air flows from the compressor 708, through the dryer 718 where moisture is removed from the air, and through the second control valve 738 to the second component.

In a second control mode of the system 700, the compressor 108 is not operated and does not supply compressed air. The second control valve 738 is in the open position, and air flows from the second component 706 to the dryer 718 along the second supply path 730. The air that is returned to the dryer 718 has relatively low moisture content, having previously been dried by the dryer 718. As the air passes through the dryer 718, moisture is returned to the air, which restores the ability of the dryer 718 to remove moisture from damp air. The first control valve 736 is in the open position, and the air that is supplied to the dryer 718 from the second component 706 along the second supply path 730 flows to the first component 704 along the dryer supply path 760 and the first supply path 728, is used by the first component 704 to perform a function, and exits the system 700, such as by being exhausted to ambient.

Figure 8:
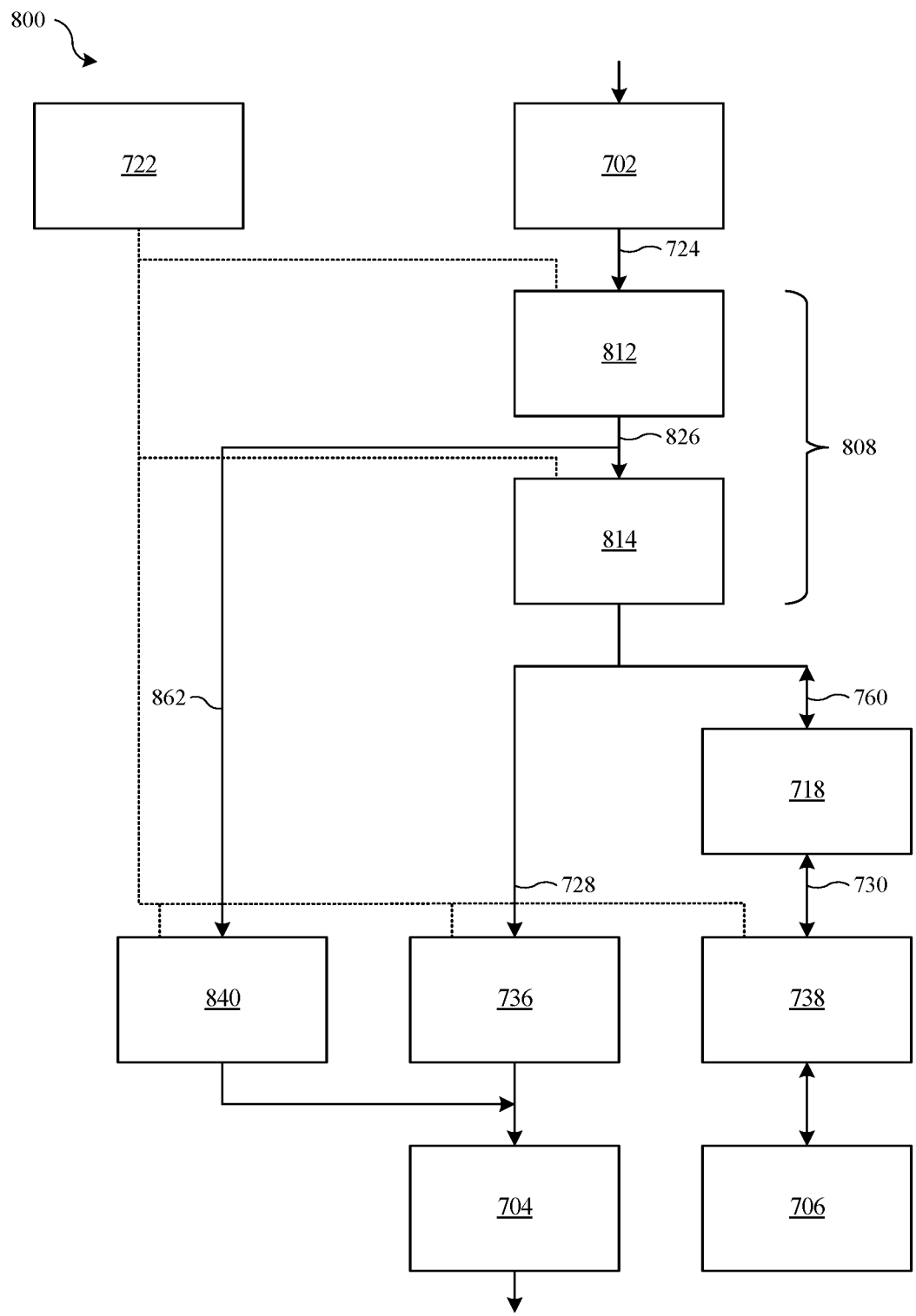
FIG. 8 is an illustration of a system according to a further example.

FIG. 8 is an illustration of a system 800, which is an implementation of the system 100. Like numbered parts from the system 100 and the system 700 are included in the system 800 and are implemented according to the previous description unless stated otherwise.

In the system 800, the compressor 708 of the system 700 is replaced by a compressor 808. The compressor 808 is a two-stage compressor that includes a first stage 812 and a second stage 814. The first stage 812 and the second stage 814 may be operated by a single motor, as described with respect to previous implementations, and the first stage 812 and/or the second stage 814 may be connected to the motor by a clutch to allow independent operation of the compressor stages, as described with respect to previous implementations. The inlet path 724 is connected to the inlet of the first stage 812, the outlet of the first stage 812 is connected to the inlet of the second stage 814 by a compressor path 826, and the outlet of the second stage is connected to the dryer supply path 760. In the system 800, by operating both the first stage 812 and the second stage 814 simultaneously, the first stage 812 may compress the air to a first pressure and the second stage 814 may compress the air to a second pressure that is higher than the first pressure.

A bypass supply path 862 is configured to supply air from the first stage 812 of the compressor 908 to the first component 704 without passing the air from the first compressor stage through the second stage 814 of the compressor 908 or the dryer 718. In the illustrated implementation, the bypass supply path 862 extends from an outlet of the first stage 812 of the compressor 908 (e.g., either directly or by connection to the compressor path 826) to a bypass valve 840 (e.g., a third control valve) which is further configured to block or allow flow of air from the bypass supply path 862 to the first component 704 (e.g., by moving between a closed position and an open position). This allows air at the first pressure to be supplied to the first component 704 in a third control mode, by directing the air to the first component 704 from the first stage 812 along the bypass supply path 862 by moving the bypass valve 840 to the open position. In the third control mode as applied to the system 800, the second stage 814 of the compressor may be deactivated so that it is not operating while air is being supplied to the first component 704 from the first stage 812. Alternatively, the second stage 814 may be operated in the third control mode to simultaneously supply air from the second stage 814 to the second component 706 by way of the dryer 718.

Figure 9:
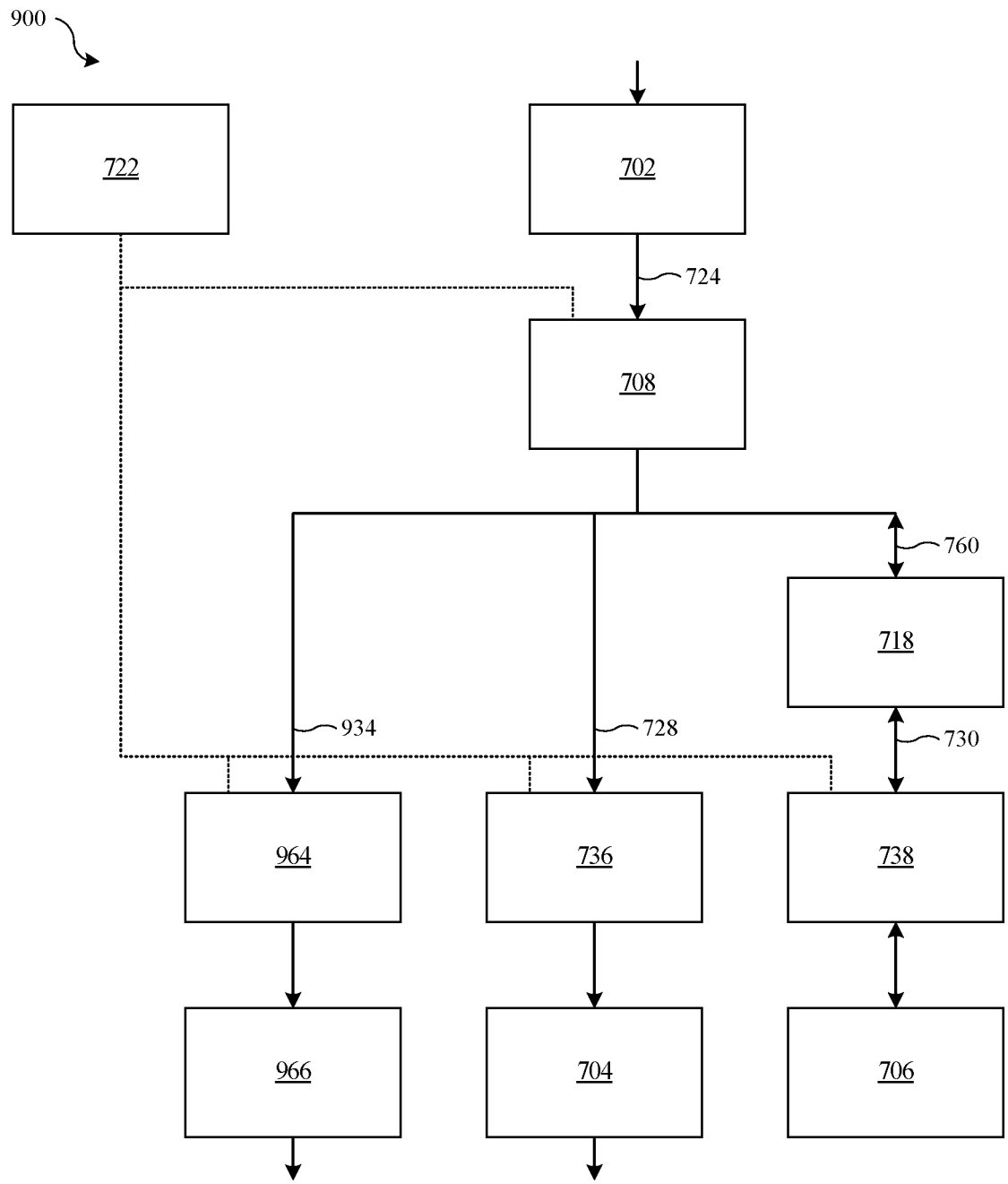
FIG. 9 is an illustration of a system according to a further example.

FIG. 9 is an illustration of a system 900, which is an implementation of the system 100. Like numbered parts from the system 100 and the system 700 are included in the system 900 and are implemented according to the previous description unless stated otherwise.

The system 900 includes a vent path 934, a vent valve 964, and a vent 966. The vent path 934 is connected to the compressor 708 and allows air to be vented from the system 900, such as by venting to ambient at the vent 966 (e.g., an air outlet to the external environment). The vent valve 964 is located along the vent path 934 and is movable between a closed position, in which the vent path 934 is blocked and air is not vented, and an open position, in which the vent path 934 is not blocked and air is vented from the system 900. The vent valve 964 may be, for example, an electrically actuated valve that is controlled by the controller 722 and moves between the closed and open positions in response to commands from the controller 722.

The system 900 operates according to the description of operation of the system 700, except for addition of a third control mode in which air is vented from the second component 706 through the dryer 718 to the vent 966. In this control mode, the compressor 708 is not operating, the first control valve 736 can be in any position, the second control valve 738 is in the open position, and the vent valve 964 is in the open position. Air passing out of the second component 706 through the dryer 718 may absorb moisture from the dryer 718 prior to flowing out of the dryer along the dryer supply path 760 and vent path 934 to the vent 966.

Figure 10:
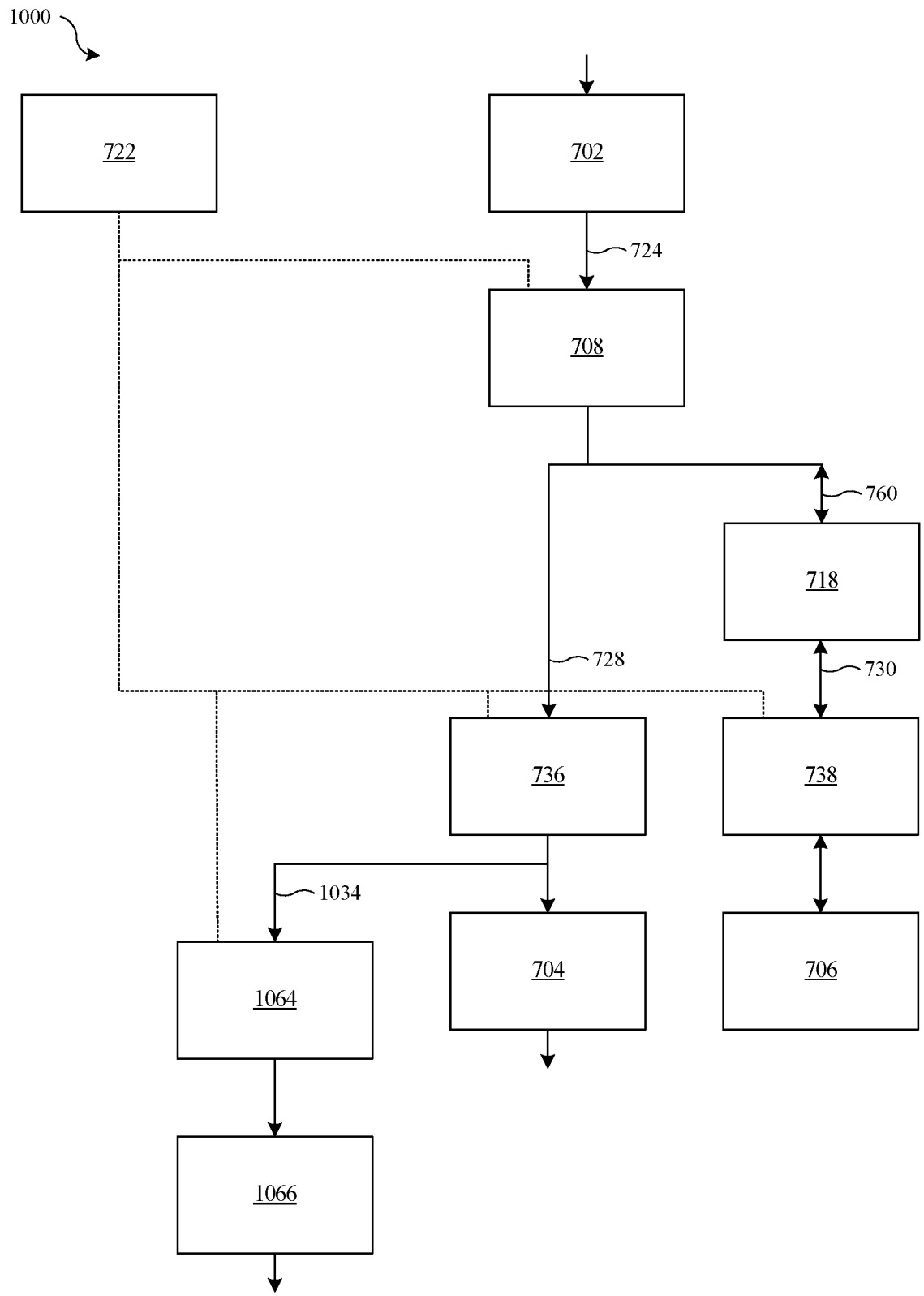
FIG. 10 is an illustration of a system according to a further example.

FIG. 10 is an illustration of a system 1000, which is an implementation of the system 100. Like numbered parts from the system 100 and the system 700 are included in the system 1000 and are implemented according to the previous description unless stated otherwise.

The system 1000 includes a vent path 1034, a vent valve 1064, and a vent 1066. These components are equivalent in function and implementation to the vent path 1034, the vent valve 1064, and the vent 1066 of the system 800 except as noted. The vent path 1034 is connected to the first supply path 728 between the first control valve 736 and the first component 704. As a result, air can be vented from the system 1000 (e.g., by venting to ambient) by the vent 1066 when the first control valve 736, the second control valve 738 and the vent valve 1064 are all in their respective open positions.

The system 1000 operates according to the description of operation of the system 700, except for addition of a third control mode in which air is vented from the second component 706 through the dryer 718 to the vent 1066. In this control mode, the compressor 708 is not operating, the first control valve 736 is in the open position, the second control valve 738 is in the open position, and the vent valve 1064 is in the open position. Air passing out of the second component 706 through the dryer 718 may absorb moisture from the dryer 718 prior to flowing out of the dryer along the dryer supply path 760, first supply path 728 and the vent path 1034 to the vent 1066.

It should be understood that features from of the foregoing implementations can be combined. Examples of further implementations that combine features from previous illustrations will be described with respect to FIGS. 10-12.

Figure 11:
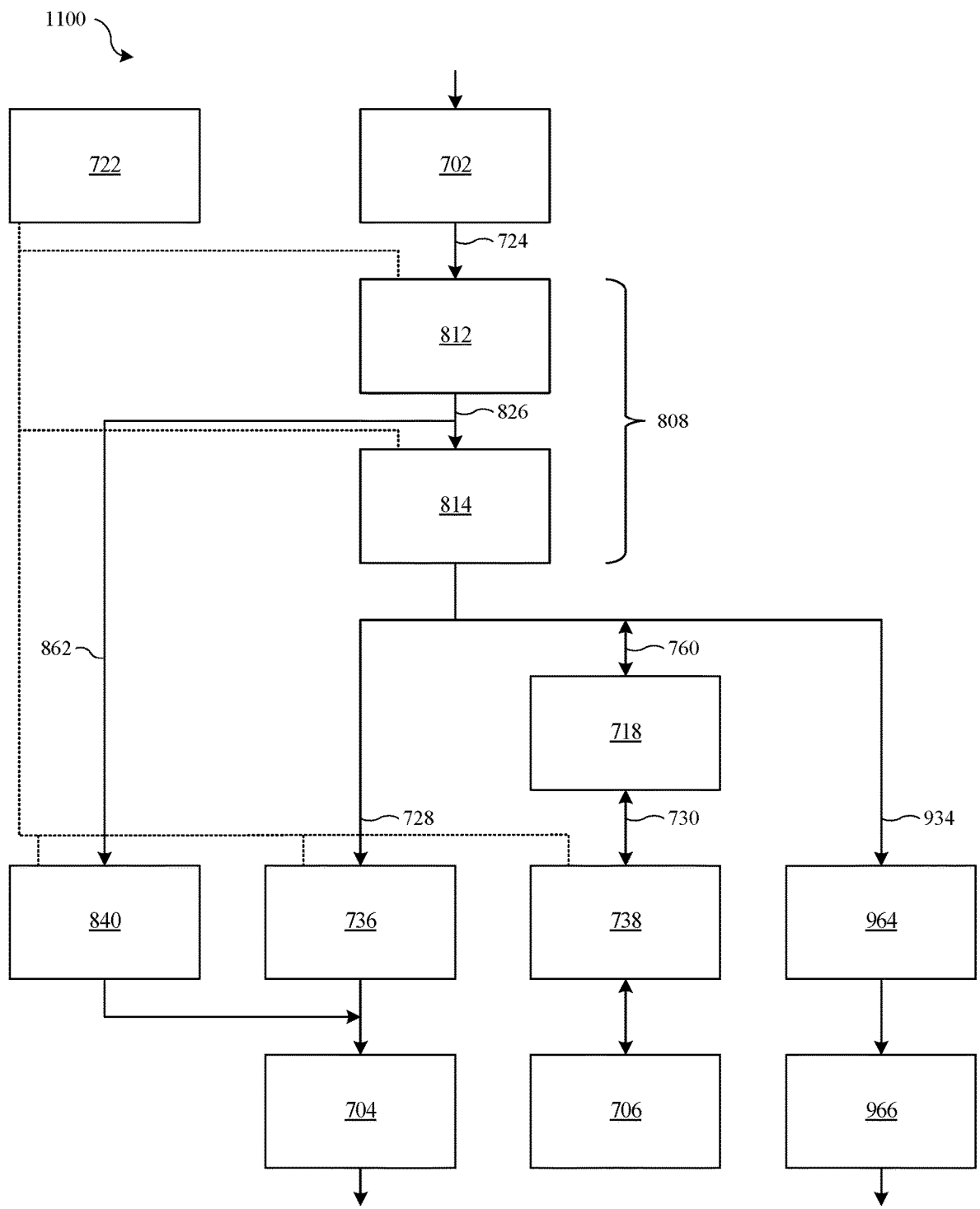
FIG. 11 is an illustration of a system according to a further example.

FIG. 11 is an illustration of a system 1100, which is an implementation of the system 100, and incorporates features from the system 800 and the system 900. Like numbered parts from the system 100, the system 700, the system 800, and the system 900 are included in the system 1000 and are implemented according to the previous description unless stated otherwise. The system 1000 includes the compressor 808 of the system 800, inclusive of the first stage 812, the second stage 814, the compressor path 826, and the bypass supply path 862 of the system 800, which supplies air from the first stage 812 of the compressor 808 to the first component 704 through the first control valve 736. The system 1000 also includes the vent path 934, the vent valve 964, and the vent 966 of the system 800. The system 1000 may be operated according to the control modes described with respect to the system 700, the system 800, and the system 800.

Figure 12:
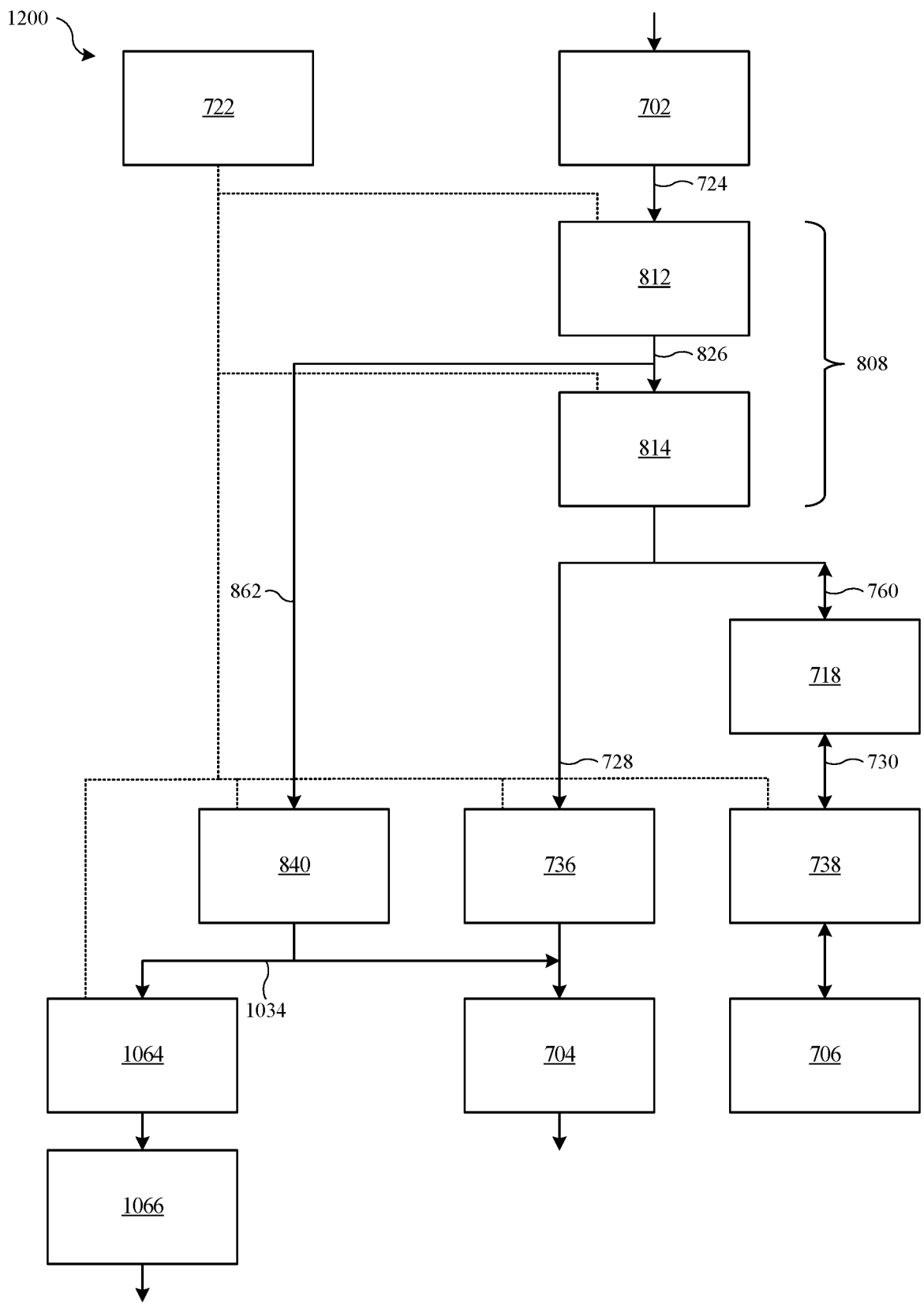
FIG. 12 is an illustration of a system according to a further example.

FIG. 12 is an illustration of a system 1200, which is an implementation of the system 100, and incorporates features from the system 800 and the system 900. Like numbered parts from the system 100, the system 700, the system 800, and the system 900 are included in the system 1200 and are implemented according to the previous description unless stated otherwise. The system 1200 includes the compressor 808 of the system 800, inclusive of the first stage 812, the second stage 814, the compressor path 826, and the bypass supply path 862 of the system 800, which supplies air from the first stage 812 of the compressor 808 to the first component 704 through the first control valve 736. The system 1200 also includes the vent path 1034, the vent valve 1064, and the vent 1066 of the system 900. The system 1200 may be operated according to the control modes described with respect to the system 700, the system 800, and the system 900.

Figure 13:
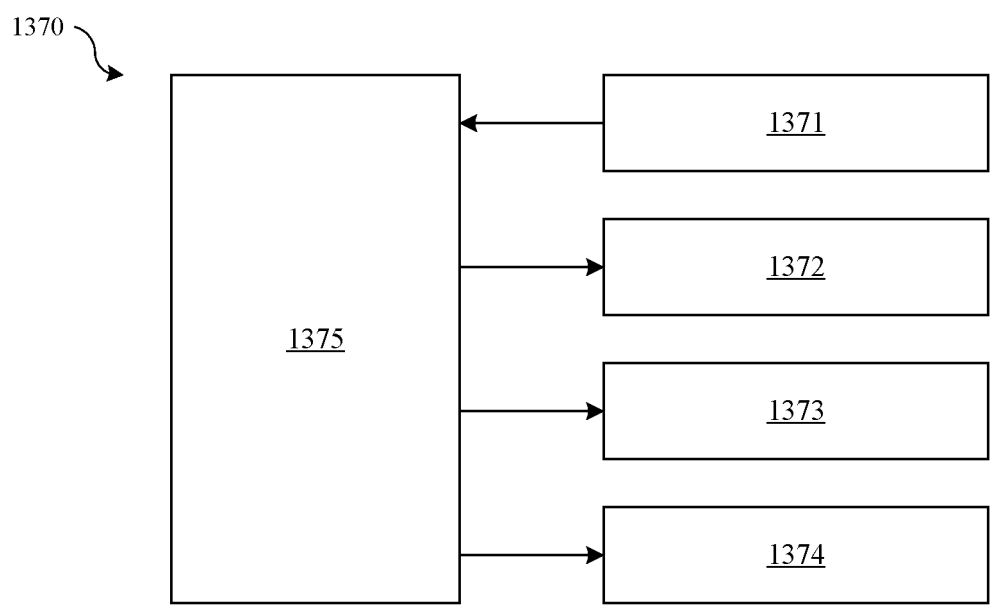
FIG. 13 is a block diagram of an example of a computing device.

FIG. 13 is an illustration of an example of a computing device 1370 that can be used to implement the controllers that are incorporated in the systems and devices that are described herein, such as the controller 122 and the controller 722. The computing device 1370 includes a processor 1371, a memory device 1372, a storage device 1373, a communications interface 1374, and a bus 1375. The processor 1371 is a conventional processing device that is operable to receive inputs, execute instructions, and generate outputs. The memory device 1372 is operable to store information for immediate access by the processor 1371, and may be volatile information storage medium, such as a random-access memory device. The storage device 1373 is a non-volatile information storage medium such as flash memory, a hard-disk drive, or a solid-state drive. The communications interface 1374 is operable to receive information from external sources and to send information to external sources, such as by receiving signals that represent sensor outputs and by transmitting signals that represent commands. The bus 1375 is a conventional system bus of any type that interconnects the various components of the computing device 1370. Other conventional components may be included in the computing device 1370.

As used in the claims, phrases in the form of "at least one of A, B, or C" should be interpreted to encompass only A, or only B, or only C, or any combination of A, B and C.

As described above, one aspect of the present technology is operation of a pneumatic system, which may be incorporated in or used in conjunction with a device that includes the gathering and use of data available from various sources. As an example, such data may identify a user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user preferences so that user settings can be applied automatically when the device is used. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information needed to configure a device according to user preferences may be obtained each time the system is used and without subsequently storing the information or associating the information with the particular user.

What is claimed is:

1. A system, comprising:
a source that provides air;
a first compressor stage that receives the air from the source and is configured to compress the air to a first pressure;
a second compressor stage that receives the air from the first compressor stage and is configured to compress the air to a second pressure;
a first component;
a second component;
a first control valve configured to control supply of the air to the first component and
a second control valve configured to be movable between a supply position and a vent position,
wherein the system is configured to operate according to a first control mode, in which the air is supplied to the first component by the first compressor stage, a second control mode, in which the air is supplied to the second component by the second compressor stage, and a third control mode in which the air is vented to an ambient environment through an outlet of the system.

2. The system of claim 1, further comprising:
a motor that provides an operating input to the first compressor stage and the second compressor stage; and
a clutch that disconnects the motor from the second compressor stage so that the second compressor stage does not compress the air in the first control mode.

3. The system of claim 1, further comprising:
a first supply path from the first compressor stage to the first component, the first control valve located along the first supply path, wherein the air is supplied from the first compressor stage to the first component along the first supply path in the first control mode; and
a second supply path from the second compressor stage to the second component, the second control valve located along the second supply path, wherein the air is supplied from the second compressor stage to the second component along the second supply path in the second control mode.

4. The system of claim 3, further comprising:
a bypass valve that is connected to the second supply path, the bypass valve configured to allow the air from the second compressor stage to bypass the second component.

5. The system of claim 4, further comprising:
a bypass path that connects the second supply path to the first supply path, wherein the bypass valve is located on the bypass path to allow the air from the second compressor stage to bypass the second component by redirecting the air to the first supply path.

6. The system of claim 3, further comprising:
a dryer that is located on the second supply path between the second compressor stage and the second component,
wherein when the system is operated according to the third control mode, the air is vented from the second component through the dryer.

7. The system of claim 1, wherein the first component is an air operated cleaning component for a vehicle sensor and the second component is an air operated vehicle suspension component.

8. A system, comprising:
an inlet;
a first compressor;
a second compressor;
a low pressure consumer;
a high pressure consumer;
a first supply path from the first compressor to the low pressure consumer, wherein air is supplied from the first compressor to the low pressure consumer along the first supply path;
a second supply path from the second compressor to the high pressure consumer, wherein the air is supplied from the second compressor to the high pressure consumer along the second supply path;
a diverter path from the high pressure consumer to the low pressure consumer to allow supply of air to the low pressure consumer from the high pressure consumer; and
a vent path connected to the second supply path to allow venting of air from the high pressure consumer to an ambient environment.

9. The system of claim 8, further comprising:
a diverter valve that controls supply of the air to the low pressure consumer from the high pressure consumer along the diverter path.

10. The system of claim 9, further comprising:
a first control valve that controls supply of the air to the low pressure consumer along the first supply path; and
a second control valve that controls supply of the air to the high pressure consumer along the second supply path and controls venting of the air from the high pressure consumer along the second supply path.

11. The system of claim 8, wherein the low pressure consumer is a sensor cleaning system, and the high pressure consumer is an air suspension system.

12. A system, comprising:
an inlet;
a compressor that receives air from the inlet;
a wet air consumer;
a dry air consumer;
a first supply path from the compressor to the wet air consumer, wherein the air is supplied from the compressor to the wet air consumer along the first supply path;
a first control valve that controls supply of the air to the wet air consumer along the first supply path;
a second supply path from the compressor to the dry air consumer, pneumatically in communication with the first supply path, wherein the air is supplied from the compressor to the dry air consumer along the second supply path; and an air dryer that forms a portion of the second supply path to remove moisture from air that is supplied to the dry air consumer from the compressor, wherein moisture is returned to the air from the air dryer during venting of the air from the dry air consumer through the air dryer.

13. The system of claim 12, wherein the wet air consumer is a sensor cleaning system, and the dry air consumer is an air suspension system.

14. The system of claim 12, wherein the compressor comprises a first compressor stage that receives the air from the inlet and is configured to compress the air to a first pressure, and a second compressor stage that receives the air from the first compressor stage and is configured to compress the air to a second pressure.

15. The system of claim 14, further comprising:
a second control valve that controls supply of the air to the dry air consumer along the second supply path;
a third supply path from the first compressor stage to the wet air consumer, wherein the air is supplied from the first compressor stage to the wet air consumer along the third supply path; and
a third control valve that controls supply of the air to the wet air consumer along the third supply path.

16. The system of claim 12, further comprising:
a vent;
a vent path from the compressor to the vent, pneumatically in communication with the second supply path, wherein the air is supplied from the dry air consumer to the vent along the second supply path and the vent path; and
a vent valve that controls supply of the air to the vent along the vent path.

17. The system of claim 12, further comprising:
a vent;
a vent path from the first control valve to the vent, pneumatically in communication with the first supply path, wherein the air is supplied from the dry air consumer to the vent along the second supply path, the first supply path and the vent path; and
a vent valve that controls supply of the air to the vent along the vent path.

18. The system of claim 1, wherein the second control valve controls supply of the air to the second component when in the supply position and allows venting of the air from the second component through the second control valve when in the vent position.

19. The system of claim 18, wherein the second control valve, when in the supply position, allows one-way flow for supply of the air to the second component from the second compressor stage in the second control mode.

20. The system of claim 1, wherein when the system is operated according to the third control mode, the first compressor stage and the second compressor stage are not operating.

21. The system of claim 4, wherein the first control valve, the second control valve, and the bypass valve are configured to allow supply of the air to the first component from the first compressor stage in the first control mode and to block supply of the air from the first compressor stage to the first component in the second control mode.

22. The system of claim 4, wherein the second control valve and the bypass valve are configured to redirect the supply of the air from the second compressor stage away from the second component in the first control mode.

* * * * *